US010601647B2

(12) United States Patent
Berry

(10) Patent No.: US 10,601,647 B2
(45) Date of Patent: Mar. 24, 2020

(54) NETWORK CONFIGURATION SYSTEM

(71) Applicant: Dell Products L.P., Round Rock, TX (US)

(72) Inventor: Andrew Berry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 14/587,773

(22) Filed: Dec. 31, 2014

(65) Prior Publication Data

US 2016/0191308 A1 Jun. 30, 2016

(51) Int. Cl.
*H04L 12/24* (2006.01)
(52) U.S. Cl.
CPC ...... *H04L 41/0806* (2013.01); *H04L 41/0886* (2013.01); *H04L 41/082* (2013.01)
(58) Field of Classification Search
CPC  H04L 41/0806; H04L 41/0886; H04L 41/082
USPC .................................................. 709/220–222
See application file for complete search history.

(56) References Cited

U.S. PATENT DOCUMENTS

| 7,107,326 | B1* | 9/2006 | Fijolek | H04L 61/2015 |
| | | | | 709/220 |
| 7,363,514 | B1* | 4/2008 | Behren | G06F 9/4416 |
| | | | | 713/100 |
| 7,697,419 | B1* | 4/2010 | Donthi | H04L 49/65 |
| | | | | 370/220 |
| 8,321,538 | B2 | 11/2012 | Ford et al. | |
| 9,286,047 | B1* | 3/2016 | Avramov | G06F 8/61 |
| 9,697,095 | B2* | 7/2017 | Berry | G06F 11/2005 |
| 2004/0003059 | A1* | 1/2004 | Kitchin | H04L 63/062 |
| | | | | 709/220 |
| 2004/0081104 | A1 | 4/2004 | Pan et al. | |
| 2005/0006468 | A1* | 1/2005 | Fandel | G06Q 20/20 |
| | | | | 235/383 |
| 2011/0258333 | A1* | 10/2011 | Pomerantz | H04L 63/0428 |
| | | | | 709/229 |

(Continued)

OTHER PUBLICATIONS

Dell Networking N3000 Series, May 2015, Version 1.5, 2 Pages, Dell Inc., http://partnerdirect.dell.com/sites/channel/Documents/Dell-Networking-N3000-Series-Spec-Sheet.pdf.

*Primary Examiner* — Minh Chau Nguyen
(74) *Attorney, Agent, or Firm* — Haynes and Boone, LLP

(57) ABSTRACT

A networked system includes a network. A secondary device is coupled to the network. A primary device is coupled to the network and includes a key device connector. The primary device may detect that a key device that includes a plurality of configuration information is coupled to the key device connector. The primary device then retrieves first configuration information of the plurality of configuration information from the key device for the primary device and configures the primary device using the first configuration information. The primary device then discovers the secondary device through the network, retrieves second configuration information of the plurality of configuration information from the key device for the secondary device, and provides the second configuration information over the network to the secondary device to initiate configuration of the secondary device using the second configuration information.

20 Claims, 6 Drawing Sheets

(56) References Cited

U.S. PATENT DOCUMENTS

| | | | |
|---|---|---|---|
| 2011/0280572 A1* | 11/2011 | Vobbilisetty | H04L 49/357 398/45 |
| 2011/0299413 A1* | 12/2011 | Chatwani | H04L 12/4625 370/252 |
| 2013/0297757 A1* | 11/2013 | Han | H04L 41/0806 709/222 |

* cited by examiner

SETUP FILE

| MAC ADDRESS 502 | IP ADDRESS 504 | NETMASK 506 | CONFIGURATION NAME 507 | IMAGE NAME 508 | STATUS 510 |
|---|---|---|---|---|---|
| 2180.c200.0010 | 192.168.0.10 | 255.255.255.0 | device-A.text | PC6200vR.5.4.1.stk | in-use |
| 3380.c200.0010 | 192.168.0.11 | 255.255.255.0 | device-A.text | PC6200vR.5.4.1.stk | in-use |
| | 192.168.0.18 | <netmask> | device-F.text | PC6200vR.5.4.1.stk | invalid |
| | 192.168.0.12 | <netmask> | device-B.text | PC6200vR.5.4.1.stk | |
| | 192.168.0.13 | <netmask> | device-A.text | PC6200vR.5.4.1.stk | |
| 0180.c200.0010 | | | device-Y.text | PC6200vR.5.4.1.stk | |
| 1180.c200.0010 | | | device-Z.text | PC6200vR.5.4.1.stk | in-use |

NETWORK CONFIGURATION SYSTEM

BACKGROUND

The present disclosure relates generally to information handling systems, and more particularly to automatically configuring a plurality of networked information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSs such as, for example, switches may be networked to provide networked systems that may be setup, configured and upgraded by an administrator. Configuration of a networked system may be accomplished using system configuration applications that allow the administrator to configure, upgrade, and provide consistency in the IHSs in the networked system. However, with the numerous variants of IHSs that may be interconnected in the networked system, the configuration of the IHSs in the networked systems becomes challenging and expensive. For example, in the context of tens of thousands of devices networked using one or more switches, ensuring the compliancy and consistency of the configuration across all of the switches and devices via conventional mechanisms that utilize dynamic host configuration protocol (DHCP) servers or trivial file transfer protocol (TFTP) devices, physically moving the configuration devices between the switches and devices, and manually performing the configuration process is extremely expensive, time consuming, and error prone.

Accordingly, it would be desirable to provide an improved configuration system for a network.

SUMMARY

According to one embodiment, a switch includes a network port; a universal serial bus (USB) device port; at least one configurable subsystem; and a switch configuration engine that is coupled to the network port, the USB device port, and the at least one configurable subsystem, wherein the switch configuration engine is configured to: detect that a USB device is coupled to the USB device port, wherein the USB device includes a plurality of configuration information; retrieve first configuration information of the plurality of configuration information from the USB device for the at least one configurable subsystem; configure the at least one configurable subsystem using the first configuration information; discover a configurable device that is coupled to the network port; retrieve second configuration information of the plurality of configuration information from the USB device for the configurable device; and provide the second configuration information through the network port to the configurable device. In the embodiments described herein, one or more of the above steps may be repeated as many times as necessary to complete the configuration of any number of a plurality of systems.

BRIEF DESCRIPTION OF THE DRAWINGS

FIG. 5 is a table illustrating an embodiment of a setup file that may be stored on the key device of FIG. 4.

DETAILED DESCRIPTION

For purposes of this disclosure, an information handling system (also referred herein as a networked device) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
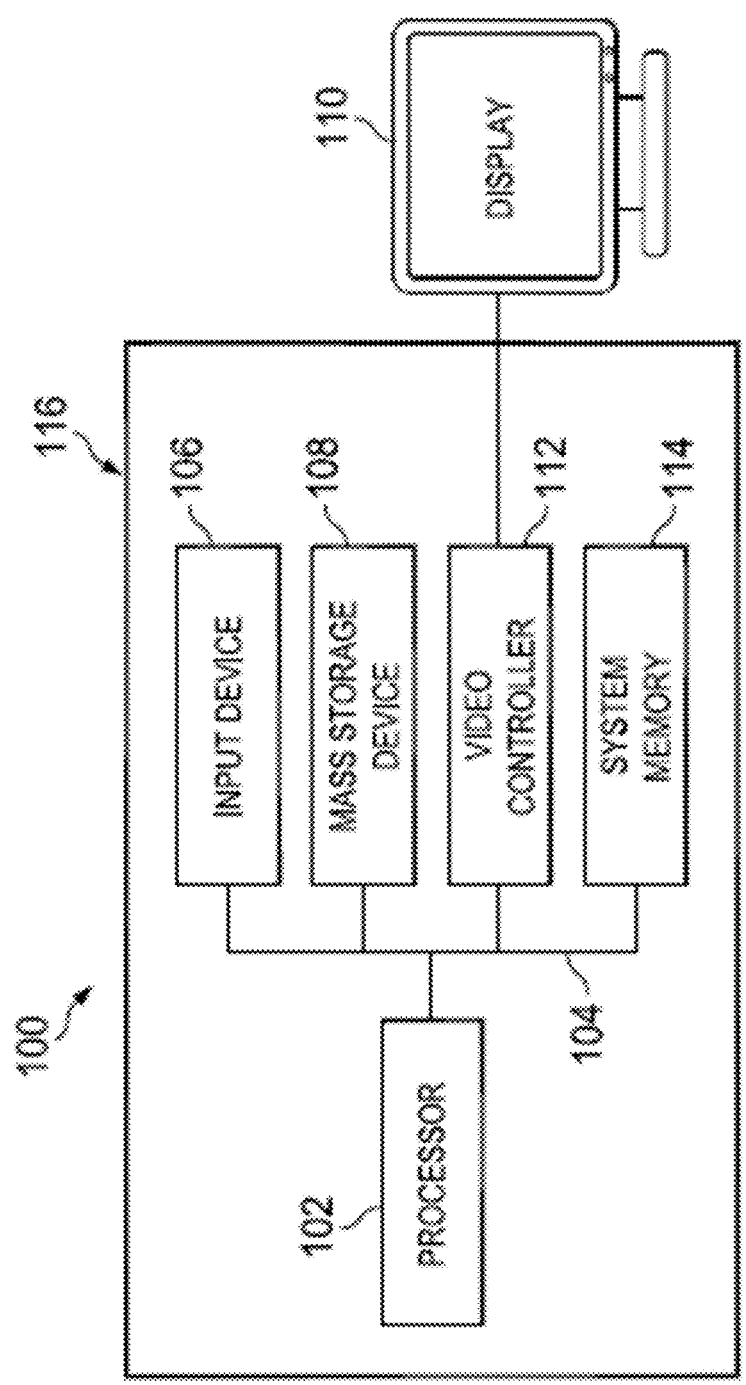
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102. In an embodiment, the IHS 100 may be a networked device and is also referred herein as the networked device 100.

Figure 2:
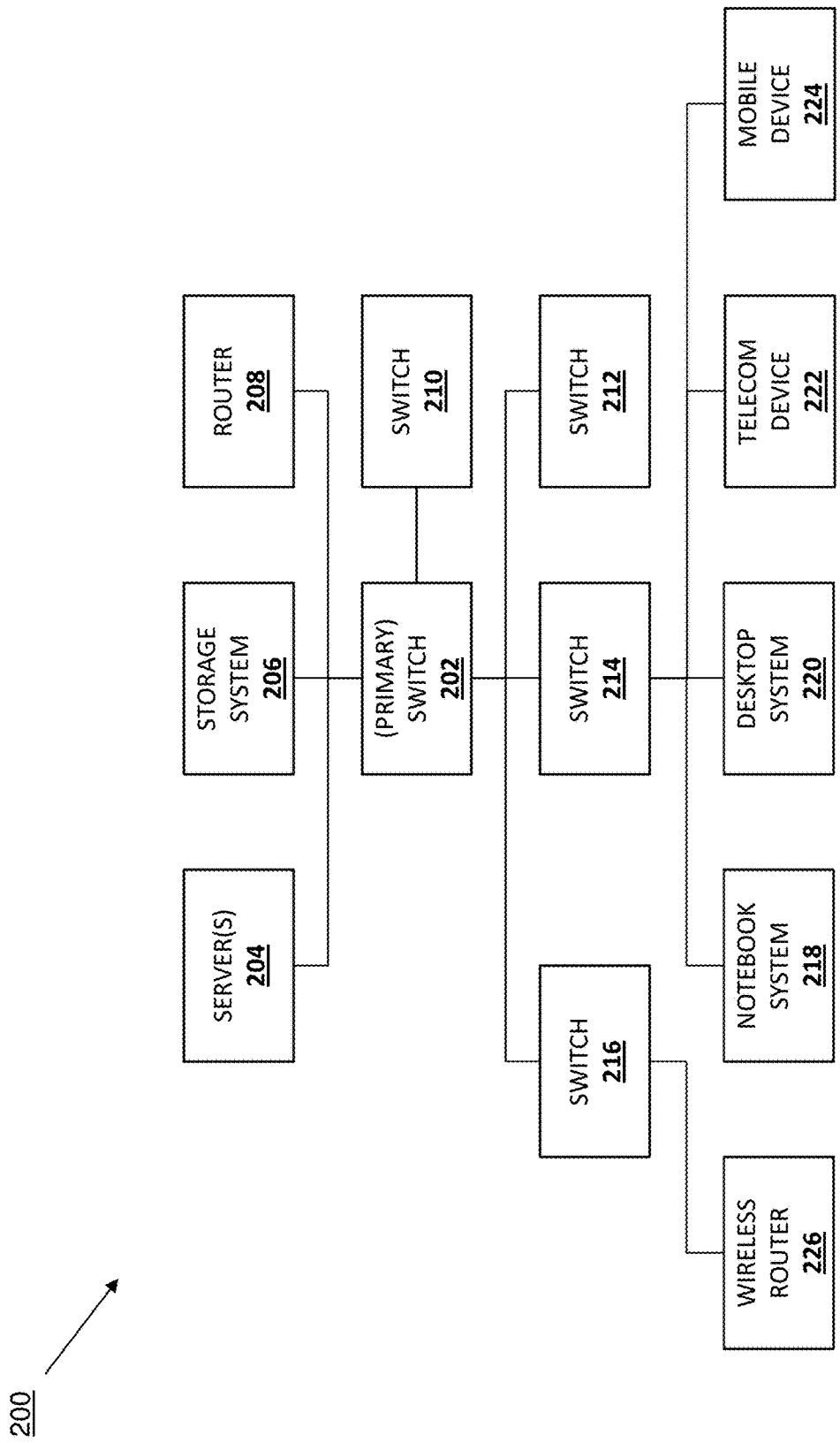
FIG. 2 is a schematic view illustrating an embodiment of a networked system.

Referring now to FIG. 2, an embodiment of a networked system 200 is illustrated. In the illustrated embodiment, the networked system 200 includes a switch 202 that may be the IHS discussed above with reference to FIG. 1 and/or may include some or all of the components of the IHS 100. For example, the switch 202 may include a multi-port network bridge, an Ethernet switch, a Fibre Channel switch, and/or a variety of other switches known in the art. In the embodiments discussed below, the switch 202 is sometimes referred to as a primary switch 202. However, in different embodiments, other switches or device in the networked system 200 may be a primary switch or device that operates similarly to the primary switch 202 discussed below. In different embodiments, the primary switch 202 may be coupled to a variety of IHSs known in the art in the networked system 200, at least some of which are also referred to below as secondary switches and/or secondary devices. For example, in the illustrated embodiment, the primary switch 202 is coupled to one or more servers 204, a storage system 206, a router 208, and a plurality of other switches 210, 212, 214, and 216, any of which may be the secondary devices discussed below. Furthermore, those secondary devices may be coupled to other IHSs (which also may be the secondary devices discussed below) to provide the networked system 200. For example, in the illustrated embodiment, the switch 214 is coupled to a notebook system 218 (e.g., a laptop computer), a desktop system 220 (e.g., a desktop computer), a telecom device 222 (e.g., an Internet-enabled phone), and a mobile device 224 (e.g., a mobile phone); and the switch 216 is coupled to a wireless router 226. While a specific embodiment of the networked system 200 including specific IHSs and/or devices is illustrated and described herein, one of skill in the art in possession of the present disclosure will recognize that the networked system 200 may include a variety of different components and devices known in the art while remaining within the scope of the present disclosure.

Figure 3:
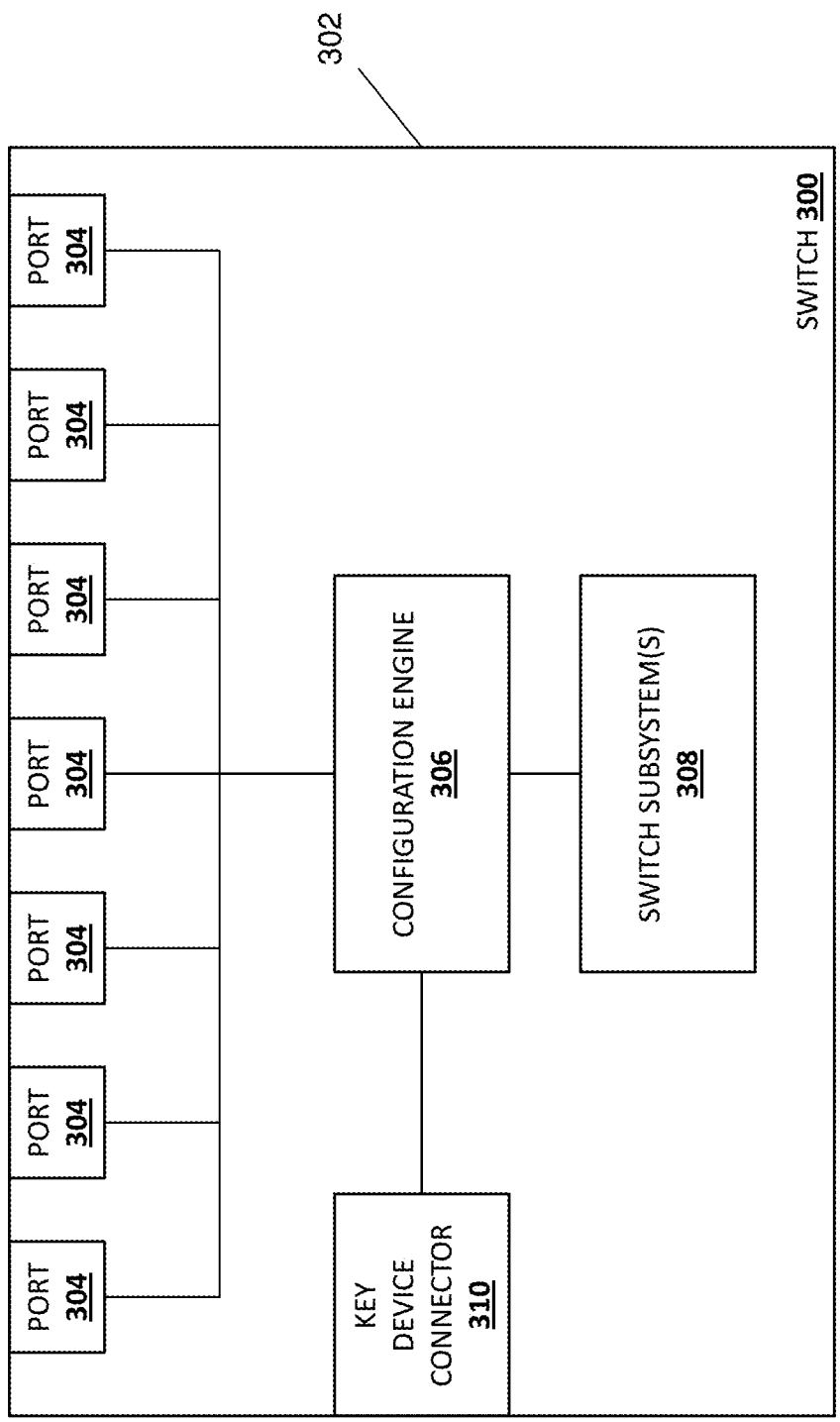
FIG. 3 is a schematic view illustrating an embodiment of a switch that may be included in the networked system of FIG. 2.

Referring now to FIG. 3, an embodiment of a switch 300 is illustrated that may be the IHS 100 discussed above with reference to FIG. 1 and/or may include any or all of the components of the IHS 100. In the embodiments discussed below, the switch 300 is discussed as being the primary switch 202 described above with reference to FIG. 2. However, in different embodiments, the switch 300 may be any of the switches 210, 212, 214, and 216 discussed above with reference to FIG. 2, and in some embodiment, other devices in the networked system 200 may include the configuration functionality (e.g., the configuration engine 306) provided by the switch 300 as described below. The switch 300 includes a chassis 302 having a plurality of ports 304 that are configured to couple the switch 300 to other devices a networked system (e.g., to couple the primary switch 202 to the server(s) 204, storage system 206, router 208, and switches 210, 212, 214, and 216 in the networked system 200). A memory system in the chassis 300 (not illustrated, but which may be the system memory 114 discussed above with reference to FIG. 1) may include instructions that, when executed by a processing system in the chassis 300 (not illustrated, but which may include the processor 102 discussed above with reference to FIG. 1), cause the processing system to provide a configuration engine 306 that is configured to perform the functions of the configuration engines and switches discussed below. The configuration engine 306 is coupled to one or more switch subsystems 308 (e.g., though a coupling between the processing system in the switch 300 and the switch subsystem(s)) that are included in the chassis 302. The one or more subsystems 308 in the switch 300 may include hardware subsystems such as processing subsystems, memory subsystems, storage subsystems, network subsystems, cooling subsystems, and/or a variety of other hardware subsystems known in the art, and the one or more subsystems 308 in the switch 300 may include software subsystems such as an operating system, applications, files, and/or other software subsystems known in the art. As is known in the art, the switch 300 includes a media access control (MAC) address that provides a unique identifier for the switch 300 and that may be, for example, associated with a internet protocol (IP) addresses as discussed below.

In the illustrated embodiment, the configuration engine 306 is also coupled to a key device connector 310 (e.g., though a coupling between the processing system in the switch 300 and the key device connector 310) which, as discussed below, is configured to physically connect a key device to the switch 300 and the configuration engine 306. For example, the key device connector 310 may be a Universal Serial Bus (USB) connector, an external hard drive connector, a solid state drive connector, a variety of other storage device connectors known in the art, an/or a variety of other physical connectors known in the art. However, while the embodiment discussed below include a key device that physically connects to the switch 300 through the key device connector 310, in other embodiments the key device connector 310 may be replaced with or include a wireless communication system (e.g., a Bluetooth communication system, a Wi-Fi communication system, a Near Field Communication (NFC) system, and/or a variety of other wireless communication systems known in the art) to provide for the transfer of information to and from the configuration engine 306 as discussed below. While a specific embodiment of the switch 300 is illustrated and described herein, the switch IHS 300 may include other components while remaining within the scope of the present disclosure, and the configuration engine 306 functionality may be provided in devices other than switches while remaining within the scope of the present disclosure.

Figure 4:
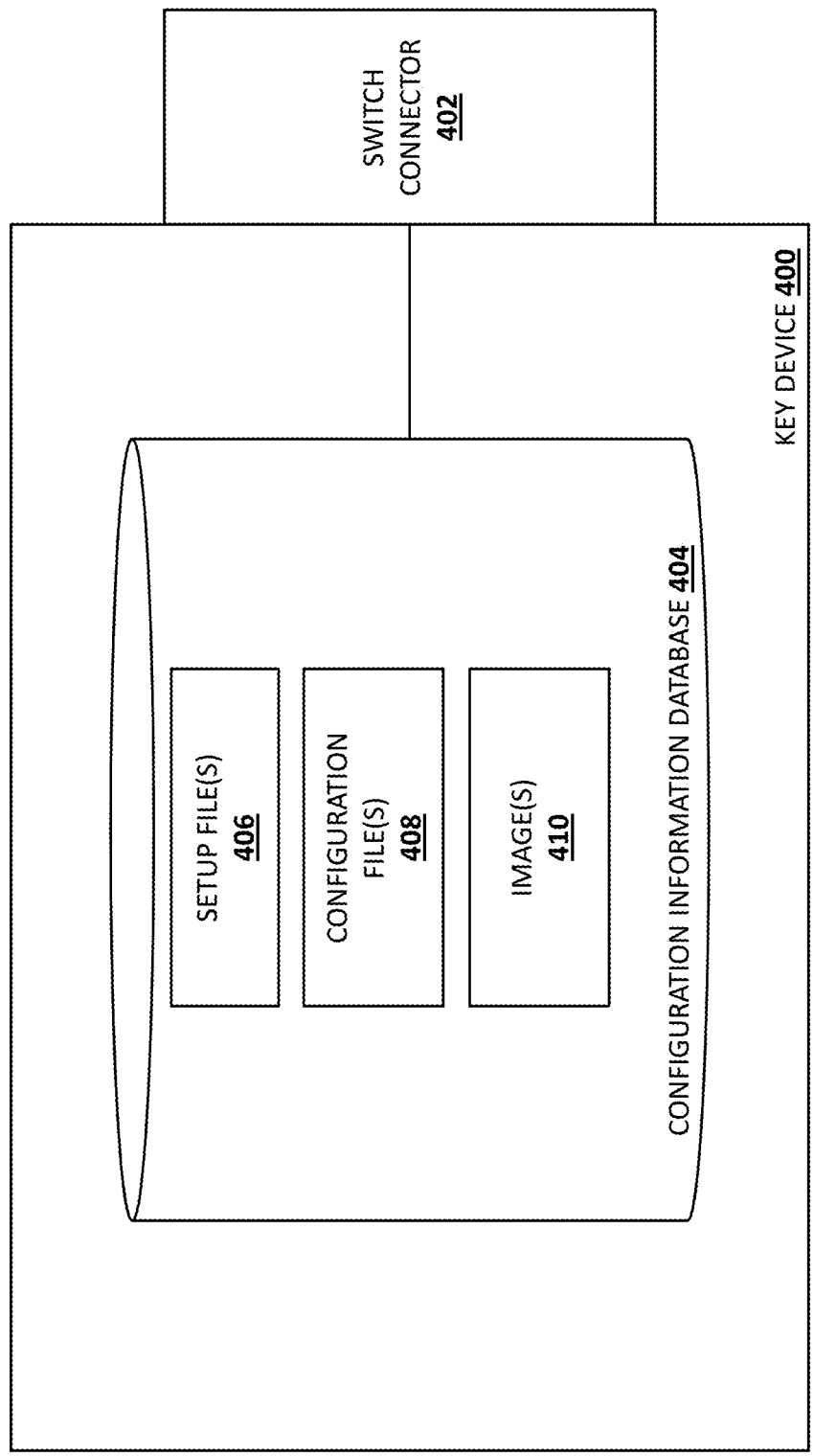
FIG. 4 is a schematic view illustrating an embodiment of a key device.

Referring now to FIG. 4, an embodiment of a key device 400 is illustrated. In different embodiments, the key device 400 may be a universal serial bus (USB) flash drive, a storage device, a database device, an external hard drive, a solid state drive, a mobile phone, a tablet computer, a laptop/notebook computer, and/or a variety of other mobile data storage repository device known in the art. The key device includes a switch connector 402 that may be configured to connect to the key device connector 310 on the switch 300 discussed above with reference to FIG. 3 via a variety of different connector technologies known in the art. The key device 400 also includes a configuration information database 404 that is coupled to the switch connector 402 (e.g., via a bus between a storage system in the key device 400 and the switch connector 402) and that includes a plurality of configuration information for the devices in the networked system 200. As discussed below, in different embodiments, the configuration information in the configuration information database 404 may include one or more setup files 406, one or more configuration files 408, and one or more images 410 (e.g., operating system images). However, as also discussed below, in some embodiments, the configuration information database 404 in a key device 400 may not include any setup files 406, configuration files 408, and/or images 410. While an embodiment of a key device 400 including specific components and configuration information is illustrated, one of skill in the art in possession of the present disclosure will recognize that the key device may include other components (e.g., for providing for the transfer of configuration information in the configuration information database 400 through the switch connector 402) and other configuration information while remaining within the scope of the present disclosure.

While the key device is described herein as a device that physically connects to the switch 300 through a physical connector, in other embodiments, the key device 400 may be replaced with similar system having wireless communication functionality, such as, for example, a wireless fidelity (Wi-fi) media drive, a Bluetooth media drive, a storage system with Wi-Fi, Bluetooth, NFC, or other wireless communication functionality, and/or a variety of other wireless communication systems known in the art. Further still, in some embodiments, the key device 400 may be configured to communication the configuration information in the configuration information database 400 over a network such as a Local Area Network (LAN).

As discussed below, the configuration information database 404 in the key device 400 may include all necessary files, data, and/or other information for configuring, setting up, and/or upgrading any or all of the devices in the networked system 200. In some embodiments, the configuration information may be provided in the configuration information database 404 by a user, network administrator, network device manufacturer, and/or other entity via one or more files. As discussed below, such file(s) may be text files that provide the setup files discussed below that include IP addresses, MAC addresses, identifiers for configuration files or images, and/or other configuration information; configuration files; images (e.g., operating system images); and/or other configuration information that are parsed and/or used by the configuration engine 306 in the switch 300.

Referring now to FIG. 5, an embodiment of a setup file 500 is illustrated that may be at least part of the one or more setup files 406 discussed above with reference to FIG. 4. In the illustrated embodiment, the setup file 500 includes a MAC address column 502, an IP address column 504, a netmask column 506, a configuration name column 507, an image name column 508, and a status column 510. Rows 512, 514, 516, 518, 520, 522, and 524 of the setup file 500 provide entries of the setup file 500 that are discussed in further detail below. For each row in the setup file 500, the MAC address column 502 may include a MAC address of device in the networked system 200, the IP address column 504 may include an IP address (which may or may not be associated with a MAC address in the MAC address column), the netmask column 506 may include a netmask associated with the IP address in the IP address column 504, the configuration name column 507 may include a configuration name associated with a configuration file (e.g., for a device identified by the MAC address in the MAC address column 502 and/or for an IP address identified by the IP address column), the image name column 508 may include an image name associated with an image (e.g., for a device identified by the MAC address in the MAC address column 502 and/or for an IP address identified by the IP address column), and the status column 510 may include a status of the IP address in the IP address column 504. As such, the rows of the setup file 500 may provide specific configuration information associated with a MAC address of a device in the networked system 200 and/or an IP address.

In the illustrated embodiment, a first entry of the setup file 500 in row 512 identifies an IP address "192.168.0.10", a netmask "255.255.255.0", a configuration file "device-A.text", and an image "PC6200vR.5.4.1.stk" associated with a device in the networked system 200 with a MAC address "2180.c200.0010", along with an "in-use" status for the first entry that indicates that the information for that first entry is currently in-use by a device in the networked system 200. Similarly, a second entry of setup 500 in row 514 identifies an IP address "192.168.0.11", a netmask "255.255.255.0", a configuration file "device-A.text", and an image "PC6200vR.5.4.1.stk" associated with a device in the networked system 200 with a MAC address "3380.c200.0010", along an "in-use" status for the second entry that indicates that the information for that second entry is currently in-use by a device in the networked system 200. A third entry of the setup file 500 in row 516 identifies an IP address "192.168.0.18", a netmask "<netmask>", a configuration file "device-F.text", and an image "PC6200vR.5.4.1.stk", and includes an "invalid status" for the third entry that indicates that at least some of the information for that third entry is invalid (e.g., the configuration file "device-F.text" and/or image "PC6200vR.5.4.1.stk" is not available, corrupted, or otherwise unusable for configuration). A fourth entry of the setup file 500 in row 518 identifies an IP address "192.168.0.12", a netmask "<netmask>", a configuration file "device-B.text", and an image "PC6200vR.5.4.1.stk", and includes a blank status that indicates that the IP address "192.168.0.12" is available and the information for that fourth entry is valid and which suggests that this line and information has not been assigned or used within the setup file and will be given to the first switch that requests an IP address. This will then cause the switch to record the MAC address with this IP address (IP binding) and mark the line status as "in-use" after loading config and image. Similarly, a fifth entry of the setup file 500 in row 520 identifies an IP address "192.168.0.13", a netmask "<netmask>", a configuration file "device-A.text", and an image "PC6200vR.5.4.1.stk", and includes a blank status that indicates that the IP address "192.168.0.13" is available and the information for that fifth entry is valid. Thus, once again, since the status is blank and the IP address has not been found and bound to a MAC address in the search, this line is still available for use. Therefore the MAC address is recorded in this file to be bound to the IP address and the line is marked "in-use" and config and image is stored on the switch. A sixth entry of setup file 500 identifies a configuration file "device-Y.text" and an image "PC6200vR.5.4.1.stk" associated with a device in the networked system 200 with a MAC address "0180.c200.0010", along an blank status that indicates that this line has not been used and the switch should not have been configured yet. So, the configuration file and image is downloaded to the switch, the IP address will be recorded from the config file and the line will be marked "in-use" within the setup file.

Figure 6:
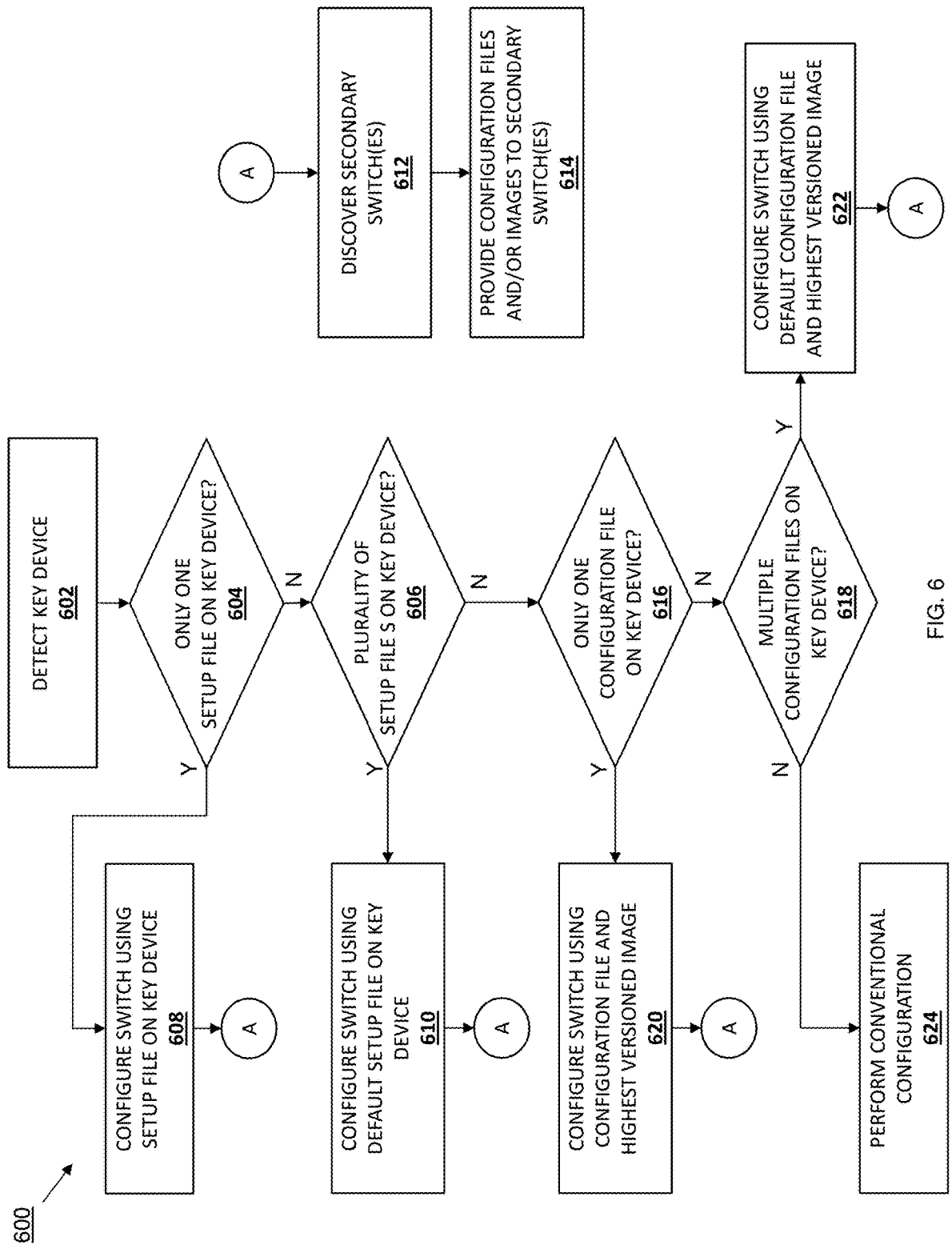
FIG. 6 is flow chart illustrating an embodiment of a method for configuring the networked system of FIG. 2.

Referring now to FIG. 6, an embodiment of a method 600 for configuring a plurality of networked devices is illustrated. As discussed in detail below, the configuration of the plurality of devices in the networked system 200 may include providing the setup file 500 on the key device 400 and connecting the key device 400 to the switch 300/primary switch 202. The switch 300/primary switch 202 will detect the key device 400, retrieve the setup file 500, and use an entry in the setup file 500 to retrieve a configuration file and/or an image and use that configuration file and/or image to configure the switch 300/primary switch 202. The switch 300/primary switch 202 will then operate to discover one or more secondary devices in the networked system 200 (e.g., the other switches in the networked system 200, all other devices in the networked system 200, etc.), and for each secondary device, the switch 300/primary switch 202 will use entries in the setup file 500 to retrieve configuration information and/or an image for each secondary device and provide the configuration information and/or image to each secondary device to initiate configuration of those secondary devices using the configuration information and/or image (e.g., by that secondary device). The configuration of the networked system 200 in this manner enables one primary switch or device to provide bare-metal provisioning or systematic reconfiguration (e.g., if the topology of the networked system 200 is corrupted) of the networked system 200 using one key device 400 that includes one or more setup files that indicate the configuration files and/or images that should be provided on those secondary devices without having to physically move the key device 400 to each one of the secondary devices, which also provides for consistent, rapid, and automatic configuration of the networked system 200 and may reduce expenses associated with the configuration of networked systems. The method below is described as being performed by a primary switch to configure itself and one or more secondary switches, but one of skill in the art in possession of the present disclosure will recognize that the primary switch and secondary switch(es) may be different types of IHSs while remaining within the scope of the present disclosure.

The method 600 begins at block 602 where a key device is detected. At block 602, the key device 400 may be connected to the switch 300 by engaging the key device connector 310 on the switch 300 with the switch connector 402 on the key device 400, and in response, the configuration engine 306 may detect that connection of the key device 400. In an embodiment, the detection of the key device 400 may be accomplished by the configuration engine 306 through the communication between the key device 400 and the configuration engine 306. For example, the configuration engine 306 may detect a signal from the key device 400 upon connection of the key device 400 to the key device connector 310. In another example, user may trigger the detection of the key device 400 by entering in an Internet Protocol (IP) address of the key device 400 and leveraging standard protocols implemented by the key device 400 such as, for example, the Simple Network Management Protocol (SNMP). In another example, the key device 400 may be connected to the switch 300 and, in response, may publish its IP address such that its IP address is transmitted to the configuration engine 306 and used by the configuration engine 306 to detect the key device 400. However, as discussed above, in other embodiments, the detection of the key device 400 may be performed by the configuration engine 306 via a wireless communication system, over a network, and/or in a variety of other manners while remaining within the scope of the present disclosure.

In an embodiment, the detection of the key device 400 at block 602 of the method 600 may be performed during boot, startup, or other initiation of the switch 300. In some embodiments, the switch 300 may perform block 602 of the method 600 in response to the configuration engine 306 determining (e.g., at boot) that there is no previous configuration (e.g., there is no existing startup configuration file or other startup configuration known in the art) stored on the switch 300, in response to the configuration engine 306 determining that the switch 300 is configured to boot using the key device 400 (e.g., a "boot multi-host usb" command in a startup configuration stored on the switch 300), and/or in response to a variety of other configuration scenarios known in the art. For example, Command Line Interface (CLI) instructions to instruct the switch 300 to boot using the key device 400 may include:

Switch # config t
Switch (config) # boot multi-host usb

One of skill in the art in possession of the present disclosure will recognize that if a previous configuration is included on the switch 300, the configuration engine 306 may configure the switch 300 using that previous configuration (e.g., unless the startup configuration on the switch 300 instructs the configuration engine 306 to boot using the key device 400). Furthermore, one of skill in the art in possession of the present disclosure will recognize that if no previous configuration (or an empty configuration) is included on the switch 300 and the configuration engine 306 is not instructed to boot using the key device 400, the switch 300 may perform, for example, a conventional dynamic host configuration protocol (DHCP) configuration process.

Following the detection of the key device 400 by the configuration engine 306 at block 602 of the method 600 (e.g., when the switch 300 includes no previous configuration and/or an instruction to boot to the key device 400), the method 600 then proceeds to decision blocks 604 or 606 where it is determined how many (if any) setup files are included on the key device and, if setup file(s) are included on the key device, to blocks 608 or 610 where one of those setup files is used to configured the switch. Specifically, at decision block 604, the configuration engine 306 accesses the configuration information database 404 in the key device 400 to determine whether only one setup file 406 is included in the configuration information database 404 on the key device 400 and, if so, the method 600 proceeds to block 608 where the configuration engine 306 retrieves that one setup file 406 from the configuration information database 404 and uses that one setup file 406 to configure the switch subsystem(s) 308 in the switch 300. If, at decision block 604, the configuration engine 306 determines that there is not only one setup file on the key device 400, the method proceeds to decision block 606 where the configuration engine 306 accesses the configuration information database 404 in the key device 400 to determine whether a plurality of setup files 406 are included in the configuration information database 404 on the key device 400 and, if so, the method 600 proceeds to block 610 where the configuration engine 306 retrieves a default setup file 406 from the plurality of setup files in the configuration information database 404 and uses that default setup file 406 to configure the switch subsystem(s) 308 in the switch 300.

In an embodiment, at decision blocks 604 and 606, the configuration engine 306 may scan the configuration information database 404 in the key device 400 for files ending with the extension ".setup" to determine whether only one or a plurality of setup files are included on the key device. As such, the method 600 may proceed from decision block 604 to block 608 when only one file with a ".setup" extension is found in the configuration information database 404, with the configuration engine 306 using that file to configure the switch 300. When a plurality of files are included in the configuration information database 404 that each include a ".setup" extension, the configuration engine 306 may review those files to find the file including "default.setup" (or other default setup file indicator) in its file name, and use that file to configure the switch at block 610.

At blocks 608 or 610, the configuration engine 306 will search the setup file to determine if the MAC address of the switch 300 is included in the setup file and, if so, the entry that includes the MAC address of the switch 300 is used by the configuration engine 306 to retrieve the configuration file and/or image included in that entry. For example, referring to the setup file 500 of FIG. 5, if the MAC address of the switch 300 is "2180.c200.0010", corresponding to row 512, the configuration engine 306 may retrieve the configuration file "device-A.text" and/or the image "PC6200vR.5.4.1.stk" at blocks 608 or 610. That configuration file and/or image may then be used by the configuration engine 306 to configure the switch 300. As such, the setup file may associate specific configuration files and/or images with a MAC address of a device in the networked system 200. If that entry also includes an IP address (e.g., "192.168.0.10" using the example above), the IP address in that entry is indicative of a previous association with the switch 300, and that IP address may then be used for the management IP address of the switch 300 so that previous settings of the switch 300 are maintained.

If the MAC address of the switch 300 is not found in the setup file, the configuration engine 306 finds the first entry in the setup file that includes an IP address and that does not include a status of "in-use" or "invalid", uses the IP address in that entry as the management IP address of the switch and the netmask in that entry as the netmask of the switch, and retrieves the configuration file and/or image included in that entry. For example, referring to the setup file 500 of FIG. 5, the configuration engine 306 may use the IP address "192.168.0.18" as the management IP address of the switch 300, corresponding to row 518, and retrieve the configuration file "device-B.text" and/or the image ""PC6200vR.5.4.1.stk". That configuration file and/or image may then be used by the configuration engine 306 to configure the switch 300. As such, a group of IP addresses may be distributed to devices in the networked system 200 similarly as is done with DHCP auto-configuration.

If the setup file used at block 608 or 610 does not identify any configuration files and/or images and only identifies IP address(es), the configuration engine 306 may use the IP address in the first entry that is not marked "in-use" or "invalid" as the management IP address of the switch 300. The configuration engine 306 may then search the configuration information database 404 in the key device 400 for configuration files and/or images (e.g., files with a ".text" or ".stk" extension). Such a situation may be employed when all switches or devices will be using the same configuration file and/or image provided on the key device 300. As such, different IP addresses may be provided to devices in the networked system 200 but then all be provided the same configuration. This is important for mass bare metal provisioning with all switches needing the basic same configuration.

In the event all entries in the setup file are marked as "in-use" or "invalid" and there is no match of a MAC address in an entry with the MAC address of the switch 300, the method 600 will end, and the configuration engine 306 or some other subsystem may display an error message to the user on a display device such as:

<###> APR 22 08:32:43 Error: Auto Configuration has terminated due to there being no more lines available for use within the key device file "XXXXXX.setup".

In the event errors occur due to the configuration file and/or image in an entry of the setup file not being present on the key device 400, not being read correctly, or being corrupted in the configuration information database 404, the configuration engine 306 will mark the entry as "invalid" in the setup file (e.g., in the status column 510 of the setup file 500), and the configuration engine 306 or some other subsystem may display an error message to the user on a display device such as:

<###> APR 22 08:32:43 Error: Auto Configuration has terminated due to a missing or corrupted XXXXXX (config or image file variable name) within the key device file "XXXXXX.setup".

It is important to note that any combination of the config or the image or both might be used in this auto configuration procedure depending on the needs of the customer.

Following the configuration of the switch 300, the entry in the setup file that was used in the configuration of the switch 300 may be marked by the configuration engine 306 as "in-use" in the setup file (e.g., in the status column 510 of the setup file 500), which allows the setup file to be reused when the key device 400 is connected to a different device in the networked system 200 to restart the method 600. In addition, the MAC address of the switch 300 is added to the entry (e.g., in the MAC address column 502 of the setup file 500) if no MAC address was previously included in that entry in order to associate the MAC address of the switch 300 with the IP address in that entry for future uses of the setup file.

Following block 608 or 610, the method 600 may proceed to blocks 612 where secondary switches are discovered, and then to block 614 where configuration files and/or images are provided to the discovered secondary switches, discussed in further detail below. However, if at decision block 606, it is determined that a plurality of setup files are not included on the key device (e.g., there are no setup files in the configuration information database 404 of the key device 400), the method 600 then proceeds to decision blocks 616 and 618 where it is determined how many (if any) configuration files are included on the key device and, if configuration file(s) are included on the key device, to blocks 620 or 622 where one of those configuration files and a highest versioned image is used to configured the switch.

Specifically, at decision block 616, the configuration engine 306 accesses the configuration information database 404 in the key device 400 to determine whether only one configuration file 408 is included in the configuration information database 404 on the key device 400 and, if so, the method 600 proceeds to block 620 where the configuration engine 306 retrieves that one configuration file 408 and the highest versioned image 410 from the configuration information database 404 and uses that one configuration file 408 and highest versioned image 410 to configure the switch subsystem(s) 308 in the switch 300. If, at decision block 616, the configuration engine 306 determines that there is not only one configuration file on the key device 400, the method proceeds to decision block 606 where the configuration engine 306 accesses the configuration information database 404 in the key device 400 to determine whether a plurality of configuration files 408 are included in the configuration information database 404 on the key device 400 and, if so, the method 600 proceeds to block 622 where the configuration engine 306 retrieves a default configuration file 408 from the plurality of configuration files and the highest versioned image 410 in the configuration information database 404 and uses that default configuration file 408 and the highest versioned image to configure the switch subsystem(s) 308 in the switch 300.

In an embodiment, at decision blocks 616 and 618, the configuration engine 306 may scan the configuration information database 404 in the key device 400 for files ending with the extension ".text" to determine whether only one or a plurality of configuration files are included on the key device. As such, the method 600 may proceed from decision block 616 to block 620 when only one file with a ".text" extension is found in the configuration information database 404. The configuration engine 306 may then also scan the configuration information database 404 in the key device 400 for files ending with the extension ".stk" and retrieve then one of those files that has the highest version, and use one file with the ".text" extension and the highest versioned ".stk" file to configure the switch 300. When a plurality of files in the configuration information database 404 include the ".text" extension, the configuration engine 306 may use the one of that plurality of files that includes "default.text" in its file name, along with the highest versioned ".stk" file, to configure the switch 300 at block 610.

If at decision block 618, the configuration engine 306 determines that there are not multiple configuration files on the key device 400 (i.e., there are no configuration files in the configuration information database 404 on the key device 400), the method 600 proceeds to block 624 where a conventional DHCP configuration process is performed.

Following blocks 608, 610, 620, or 622, the method 600 may proceed to block 612 where one or more secondary switches are discovered. In an embodiment, the configuration engine 306 operates to automatically detect other switch(es) (or in some embodiments, devices other than switches) in the networked system 200 using link layer discovery protocol (LLDP) methods, DHCP methods (e.g., DHCP discover requests), and/or other device discovery methods known in the art. In some embodiments, the secondary switch(es) in the networked system 200 that are discovered at block 612 may need to meet some predetermined criteria to be included in the secondary switches/secondary devices that are provided the configuration files and/or images at block 614 as discussed below. So, all switches without a configuration, either because the startup-config file has been erased or was never created (e.g., if the switch is brand new), may send a DHCP discover packet which can then be detected by the primary switch and if the MAC address matches, will start the processing. Also, a command on the other switch called "boot host dhcp" can be in a preconfigured switch to start this processing. For example, the configuration engine 306 may determine switches that are identified in the setup file (e.g., via their MAC address), and then may scan DHCP discover requests and/or LLDP packets to discover those secondary switches. In a specific embodiment, DHCP discover packets may be used to read MAC addresses for lookup in the setup file, and LLDP packets may be used to read IP address for lookup in the setup file.

The method 600 then proceeds to block 614 where configuration files and/or images are provided to the secondary switches in the networked system 200. In an embodiment, the configuration engine 306 in the switch 300 may utilize the setup file substantially as described above in order to determine configuration files and/or images to provide for the secondary switches in the networked system 200, and then perform a remote copy of those configuration files and/or images to each of the secondary switches. For example, at block 614, for each secondary switch, the configuration engine 306 will search the setup file to determine if the MAC address of the secondary switch is included in the setup file and, if so, the entry that includes the MAC address of the secondary switch is used by the configuration engine 306 to retrieve the configuration file and/or image included in that entry. That configuration file and/or image may then be remote copied by the configuration engine 306 to the secondary switch. As such, the setup file may associate specific configuration files and/or images with a MAC address of a secondary switch in the networked system 200. If that entry also includes an IP address, the IP address in that entry is indicative of a previous association with the secondary switch, and that IP address is then used for the management IP address of the secondary switch so that previous settings of the secondary switch are maintained.

If the MAC address of the secondary switch is not found in the setup file, the configuration engine 306 finds the first entry in the setup file that includes an IP address and that does not include a status of "in-use" or "invalid", uses the IP address in that entry as the management IP address of the secondary switch and the netmask in that entry as the netmask of the secondary switch, and retrieves the configuration file and/or image included in that entry. That configuration file and/or image may then be remote copied by the configuration engine 306 to the secondary switch. As such, a group of IP addresses may be distributed to secondary switches in the networked system 200 similarly as is done with DHCP auto-configuration. If the setup file used at block 608 or 610 does not identify any configuration files and/or images and only identifies IP address(es), the configuration engine 306 may use the IP address in the first entry that is not marked "in-use" or "invalid" as the management IP address of the secondary switch. After such line is used in the setup file, the "in-use" is marked and the MAC address is recorded on that same line. The configuration engine 306 may then search the configuration information database 404 in the key device 400 for configuration files and/or images (e.g., files with a ".text" or ".stk" extension). It is also noted that if there are no setup files on the key device, one or more secondary devices may be configured using config files and highest version images, as discussed above for the primary device.

The provisioning of the configuration files and/or images on the secondary switches in the networked system 200 allows for each of those secondary switches to configure themselves using those configuration files and/or images. For example, each of the secondary switches may include a configuration engine that is similar to the configuration engine 306 and that is configured to use the configuration files and/or images to configure its respective secondary switch. As such, the primary switch and one or more secondary switches in the networked system 200 may be automatically configured by connecting a key device to the primary switch with no need to move the key device from the primary switch and connect it to any of the secondary switches. Furthermore, in embodiments where reconfiguration of the networked system 200 is required, the key device 400 may be connected to a different switch in the networked system 200 (e.g., other than the primary switch 202 discussed above) to cause the method 600 to be performed again. Further still, the method 600 may be repeated in the same networked system 200 a plurality of times to ensure accuracy and consistency of device configuration in the networked system 200. If it is desirable to replicate the entire configuration process, the "in-use" status for each entry in a setup file may be cleared. Then, upon restart of the method 600, the MAC address/IP address combinations will be ensured for any switch that has previously attempted to upgrade its configuration, and all configuration upgrades for other switches will occur as if for the first time.

When the entire process completes without error, the system may notify the user so that the configuration may be saved. For example, the configuration engine 306 or other subsystem may display on a display device the following message:

<###> APR 22 08:32:43 Info: Auto Configuration completed using the key device file "XXXXXX.text" and/or image "version xxxx". The image has been loaded and activated but the configuration changes will not be saved until a "copy running-config startup-config" is executed.
Note: If both the image and config are to be downloaded using this process, the image should be loaded and activated (reload) first before the new config file should be moved to the running-config since there may be new configuration commands that are not supported with the old image.

Thus, systems and methods have been described that provide for the automatic (e.g., in response to a user connecting a USB key device to a switch) configuration and/or upgrade of a network switching system by initiating all necessary configuration operations for one or more secondary switches from a primary switch using a single key device, which can be used to provide consistency to the network switching system. The systems and methods allow for all "bare-metal" provisioning or systematic reconfiguration of LAN Ethernet devices in a networked system to be accomplished using one key device without the need for expensive DHCP servers, tftp devices, or other network subsystems, and without having to physically move the key device between (and physically connect it to) each switch that is to be configured.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
   a network;
   a secondary networking device that is coupled to the network;
   a primary networking device that includes a plurality of network ports that are configured to couple the primary networking device to the network, and a key device connector that is configured to couple to a key device without the use of the network, wherein the primary networking device is configured to:
      detect that a key device is coupled to the key device connector, wherein the key device includes a plurality of configuration information;
      retrieve, using a Media Access Control (MAC) address of the primary networking device, first configuration information of the plurality of configuration information from the key device for the primary networking device;
      configure the primary networking device using the first configuration information;
      discover the secondary networking device through the network;
      identify a MAC address of the secondary networking device;
      retrieve, using the MAC address of the secondary networking device, second configuration information of the plurality of configuration information from the key device for the secondary networking device; and
      provide the second configuration information over the network to the secondary networking device to initiate configuration of the secondary networking device using the second configuration information.

2. The networked system of claim 1, wherein the first configuration information includes a first image and the second configuration information includes a second image, and wherein the primary networking device is configured to:
   provide the first image on the primary device; and
   provide the second image over the network to the secondary networking device for provisioning on the secondary networking device.

3. The networked system of claim 1, wherein primary networking device has been previously configured using the first configuration information and the secondary networking device has been previously configured using the second configuration information, and wherein the primary networking device is configured to:
   perform a reconfiguration of the primary networking device using the first configuration information; and
   provide the second configuration information over the network to the secondary networking device to initiate a reconfiguration of the secondary networking device using the second configuration information.

4. The networked system of claim 1, wherein the primary networking device is configured to:
   assign a first IP address that is included in the first configuration information as a management IP address of the primary networking device; and
   provide a second IP address that is included in the second configuration information over the network to the secondary networking device to initiate assignment of the second IP address as the management IP address of the secondary networking device.

5. The networked system of claim 1, wherein the primary networking device is configured to:
   update the key device to include:
      an association between a MAC address of the primary networking device and a first IP address included in the first configuration information; and
      an association between the MAC address of the secondary networking device and a second IP address included in the second configuration information.

6. The networked system of claim 1, wherein the key device includes all necessary files for configuring and setting up the primary networking device and the secondary networking device.

7. The networked system of claim 1, wherein the first configuration information and the second configuration information are the same configuration information.

8. A switch, comprising:
   a network port;
   a universal serial bus (USB) device port;
   at least one configurable subsystem;
   a processing system that is coupled to the network port, the USB device port, and the at least one configurable subsystem, and
   a memory system that is coupled to the processing system and that includes instructions that, when executed by the processing system, cause the processing system to provide a switch configuration engine that is configured to:
- detect that a USB device is coupled to the USB device port, wherein the USB device includes a plurality of configuration information;
- retrieve, using a Media Access Control (MAC) address of the at least one configurable subsystem, first configuration information of the plurality of configuration information from the USB device for the at least one configurable subsystem;
- configure the at least one configurable subsystem using the first configuration information;
- discover a configurable device that is coupled to the network port;
- identify a MAC address of the configurable device;
- retrieve, using the MAC address of the configurable device, second configuration information of the plurality of configuration information from the USB device for the configurable device; and
- provide the second configuration information through the network port to the configurable device.

9. The switch of claim 8, wherein the first configuration information includes a first image and the second configuration information includes a second image, and wherein the switch configuration engine is further configured to:
- provide the first image on the at least one configurable subsystem; and
- provide the second image through the network port to the configurable device for provisioning on the configurable device.

10. The switch of claim 8, wherein the at least one configurable subsystem has been previously configured using the first configuration information and the configurable device has been previously configured using the second configuration information, and wherein the switch configuration engine is configured to:
- perform a reconfiguration of the at least one configurable subsystem using the first configuration information; and
- provide the second configuration information through the network port to the configurable device to initiate a reconfiguration of the configurable device using the second configuration information.

11. The switch of claim 8, wherein the switch configuration engine is configured to:
- assign a first IP address included in the first configuration information as a management IP address of the at least one configurable subsystem; and
- provide a second IP address included in the second configuration information through the network port to the configurable device to initiate assignment of the second IP address as the management IP address of the configurable device.

12. The switch of claim 8, wherein the switch configuration engine is configured to:
- update the USB device to include:
  - an association of the MAC address of the at least one configurable subsystem and a first IP address included in the first configuration information; and
  - an association of the MAC address of the configurable device and a second IP address included in the second configuration information.

13. The switch of claim 8, wherein the USB device includes all necessary files for configuring and setting up the at least one configurable subsystem and the configurable device.

14. The switch of claim 8, wherein the first configuration information and the second configuration information are the same configuration information.

15. A method for configuring a plurality of networked devices, comprising:
- detecting, by a first device that is coupled to a network through a plurality of network ports, that a portable storage device has been coupled to the first device using a portable storage device connector and without the use of the network, wherein the portable storage device includes a plurality of configuration information;
- retrieving, by the first device and using a Media Access Control (MAC) address of the first device, first configuration information of the plurality of configuration information from the portable storage device for the first device;
- configuring, by the first device, the first device using the first configuration information;
- discovering, by the first device, a second device through the network;
- identify a MAC address of the second device;
- retrieving, by the first device using the MAC address of the second device, second configuration information of the plurality of configuration information from the portable storage device for the second device; and
- providing, by the first device, the second configuration information over the network to the second device to initiate a configuration of the second device using the second configuration information.

16. The method of claim 15, wherein the first configuration information includes a first image and the second configuration information includes a second image, and wherein the method further comprises:
- providing, by the first device, the first image on the first device; and
- providing, by the first device, the second image over the network to the second device for provisioning on the second device.

17. The method of claim 15, wherein first device has been previously configured using the first configuration information and the second device has been previously configured using the second configuration information, and wherein the method further comprises:
- performing, by the first device, a reconfiguration of the first device using the first configuration information; and
- providing, by the first device, the second configuration information over the network to the second device to initiate a reconfiguration of the second device using the second configuration information.

18. The method of claim 15, further comprising:
- assigning, by the first device, a first IP address included in the first configuration information as a management IP address of the first device; and
- providing, by the first device, a second IP address included in the second configuration information over the network to the second device to initiate the assigning of the second IP address as the management IP address of the second device.

19. The method of claim 15, further comprising:
- updating, by the first device, the portable storage device to include:
  - an association of the MAC address of the first device and a first IP address included in the first configuration information; and an association of the MAC address of the second device and a second IP address included in the second configuration information.

20. The method of claim 15, wherein the portable storage device includes all necessary files for configuring and setting up the first device and the second device.

* * * * *